United States Patent [19]
Rotier

[11] 3,751,679
[45] Aug. 7, 1973

[54] FAIL-SAFE MONITORING APPARATUS

[75] Inventor: Donald J. Rotier, St. Paul, Minn.

[73] Assignee: Honeywell Inc., Minneapolis, Minn.

[22] Filed: Mar. 4, 1971

[21] Appl. No.: 121,072

[52] U.S. Cl............. 307/204, 307/211, 307/220 R, 307/243, 307/269, 307/291, 328/48, 328/50
[51] Int. Cl.... H03k 19/42, H03k 21/00, H03k 5/18
[58] Field of Search.................. 307/204, 208, 211, 307/215, 218, 219, 220, 241, 242, 243, 269, 225 R, 226 R; 328/37, 48, 50, 191, 195, 196, 201, 206

[56] References Cited
UNITED STATES PATENTS

| 3,281,580 | 10/1966 | Nines | 307/225 R X |
|---|---|---|---|
| 3,124,753 | 3/1964 | Geiseler | 328/72 X |
| 3,518,552 | 6/1970 | Carlow | 328/37 X |
| 3,541,356 | 11/1970 | Lagemann | 307/291 X |
| 3,341,816 | 9/1967 | Davis et al. | 328/147 X |
| 3,067,341 | 12/1962 | Kunzke | 328/48 X |
| 3,424,928 | 1/1969 | Priel et al. | 307/247 X |
| 3,243,606 | 3/1966 | Green et al. | 307/218 X |
| 2,994,790 | 8/1961 | Delaney | 328/48 X |
| 3,172,042 | 3/1965 | Dawirs | 328/48 |
| 3,283,172 | 11/1966 | Masters, Jr. | 307/289 X |
| 3,409,881 | 11/1968 | Marcus et al. | 307/211 X |
| 3,490,049 | 1/1970 | Choquet et al. | 328/37 X |
| 3,510,783 | 5/1970 | Smith | 307/269 X |
| 3,518,556 | 6/1970 | Holmboe et al. | 307/269 X |
| 3,549,912 | 12/1970 | Lewis | 307/247 X |
| 3,555,433 | 1/1971 | Croy | 328/37 |

FOREIGN PATENTS OR APPLICATIONS

| 1,527,368 | 4/1968 | France | 328/48 |
|---|---|---|---|

OTHER PUBLICATIONS

Owen, "Counter", IBM Technical Disclosure Bulletin, Vol. 7, No. 5, p. 361, 10/1964.

Primary Examiner—John W. Huckert
Assistant Examiner—L. N. Anagnos
Attorney—Charles J. Ungemach, Albin Medved and Earl D. Reiland

[57] ABSTRACT

The specification discloses apparatus which acts to monitor the presence of logic signals indicative of a control condition at a majority of the circuit elements sampled. A plurality of JK flip-flops are cascaded, with a source of clock signal connected to the toggle input of the first flip-flop, and the output of each flip-flop fed to the toggle input of the next succeeding flip-flop, the output of the last flip-flop being connected to an indicator. The J and K input terminals of the flip-flops receive biasing signals from sampled circuit elements which are combinatorially connected to the J and K flip-flop terminals.

6 Claims, 4 Drawing Figures

PATENTED AUG 7 1973

INVENTOR.
DONALD J. ROTIER
BY Charles J. Ungemach
ATTORNEY

FAIL-SAFE MONITORING APPARATUS

BACKGROUND OF THE INVENTION

This invention pertains to logic circuits in general and fail-safe monitoring apparatus in particular. It functions to provide a monitor of the presence of acceptable signals at a majority of the elements sampled and to indicate failure of the monitoring apparatus itself.

In the prior art, majority voting or monitoring circuits were commonly constructed of a series of paralleled resistor-diode AND gates in combination with an OR gate. An example of a typical arrangement utilized in the prior art to provide majority vote redundancy is shown in an article by M. W. Burt and D. C. James in the June, 1963 issue of Control Engineering magazine, at FIG. 4.

In such a majority voter a DC signal is passed if a majority of DC inputs are present. The disadvantage inherent in diode-resistor AND gates becomes apparent when an AND gate fails. At failure, the AND gate is likely to pass the DC signal indicating proper operation approximately 50 percent of the time, regardless of the actual conditions present.

Applicant's invention provides a substantial improvement over such a configuration, since the failure modes of the flip-flop monitor are such that normally a failure in the voter circuit will be reflected in an appropriate failure indication well over 90 percent of the time. The clock signal input to the flip-flops and the square wave output which occurs in this circuit act to give a self-test to the voting circuit itself, as well as to provide information on the presence of DC signals at the J and K input terminals.

It is therefore an important object of the present invention to provide an electronic circuit which indicates the presence of signals at a majority of a number of sampled circuit elements.

A second object of the present invention is to provide a monitoring circuit which provides a reliable indication of its own operability.

SUMMARY OF THE INVENTION

In accordance with these objects, applicant's invention utilizes a plurality of enable elements connected to receive logic signals transmitted by sampled circuit elements. Multi-stable circuit means are associated with these enable elements, and these multi-stable circuit means are capable of assuming a sequence of stable states in the present of logic signals provided by the enable elements. A means of applying pulses to the multi-stable circuit means to cause the multi-stable circuit means to assume a sequence of stable states is provided. The output of the multi-stable circuit means then will indicate the presence of the signals being monitored.

BRIEF DESCRIPTION OF THE DRAWING

Other objects and advantages of the invention will become apparent upon reading the following detailed description and upon reference to the drawings, in which.

While the invention will be described in connection with a preferred embodiment it will be understood that it is not intended to limit the invention to that embodiment. On the contrary, it is intended to cover all alternatives, modifications and equivalents as may be included with the spirit and scope of the invention as defined by the appended claims.

DESCRIPTION OF THE PREFERRED EMBODIMENT

Figures 1, 2A:
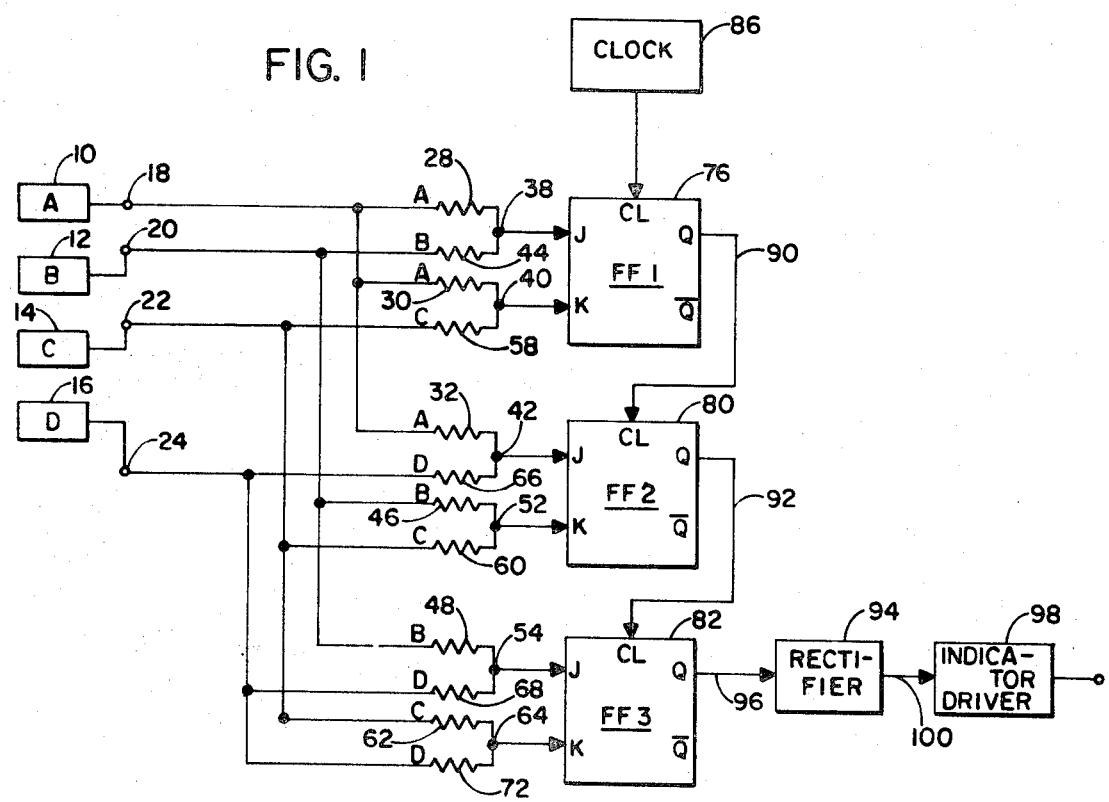
FIG. 1 shows a schematic of applicant's fail-safe monitoring apparatus in an embodiment using integrated circuit components and designed to monitor four paralleled logic inputs.
FIG. 2A shows a truth table representation of the characteristics of JK flip-flops suitable for use in the present invention.

Turning first to FIG. 1, there is shown a fail-safe monitoring circuit adapted to receive as inputs the outputs from four parallel redundant logic elements. Four redundant logic elements 10, 12, 14 and 16 are connected to a series of input terminals 18, 20, 22 and 24 respectively. Each of the logic elements 10, 12, 14 and 16 receives a particular signal, which signals are identified by the letters A, B, C, and D appearing in the blocks representing these logic elements. In a typical redundant system application, each of these signals will arrive at a logic element from one of a number of transducers adapted to measure the same parameter. The signals, conditioned by the logic elements, are fed to the input terminals as shown in FIG. 1.

The input terminal 18 is connected in common to three input resistors 28, 30, and 32. Resistors 28, 30, and 32 are connected to summing points 38, 40, and 42 respectively. These three resistors provide a voltage indicative of the voltage at element 10 to the summing points 38, 40 and 42.

Input terminal 20 is similarly connected in common to three input resistors 44, 46, and 48. Resistors 44, 46 and 48 are connected to summing points 38, 52, and 54 respectively, and provide to summing points 38, 52, and 54 a voltage indicative of the voltage output of logic element 12. In identical fashion, the input voltage at input terminal 22 is coupled to input resistors 58, 60, and 62. The resistors 58, 60, and 62 are connected to summing points 40, 52, and 64 respectively. Finally, input terminal 24 is connected to three input resistors 66, 68, and 72. The resistors 66, 68, and 72 are coupled to summing points 42, 54 and 64 respectively.

The six summing points 38, 40, 42, 52, 54, and 64 are connected to J and K inputs of three JK flip-flop elements 76, 80, and 82. These summing points add the signal voltages received and provide, at the J and K inputs, a voltage indicative of the sum of voltages provided by the input resistors.

The operation of the JK flip-flop elements is well known in the art and will be only briefly described. FIG. 2A is a table of characteristics defining a JK flip-flop as the term is intended in this application. The table in FIG. 2A is divided into two sections labeled $t_n$ and $t_{n+1}$. The section $t_n$ lists the possible combinations of logic levels at the JK inputs during the period $t_n$, that is the period between clock pulse $n$ and clock pulse $(n+1)$.

Section $t_{n+1}$ shows the state the flip-flop outputs assume in response to clock pulse ($n+1$) if the J and K input signals shown in section $t_n$ were present when the clock pulse ($n+1$) occurred.

For example, if both J and K inputs are in the "0" state, as shown in the first rank of FIG. 2A, the state of the outputs in response to a clock pulse will not change. This means that output Q at time $t_{n+1}$ will have the same value it had at $t_n$, which of course is $Q_n$. If only one input terminal is in a "1" state, for example the J terminal, then after one clock pulse, and after all successive clock pulses, the flip-flop will remain in a state with Q=1 and $\overline{Q}$=0. Only if both J and K terminals are provided with "1" inputs will the outputs vary between "1" and "0" on successive clock pulses.

Thus J and K inputs of a JK flip-flop may be utilized as enable elements to allow the flip-flop to change state in response to a clock pulse at its clock terminals when positive inputs are present. The J input acts as an enable element for the Q terminal of the flip-flop and the K element acts as an enable input for the $\overline{Q}$ terminal. JK flip-flops suitable for use in applicant's invention are commercially available. An example of such a component is the type 5300 flip-flop produced by Texas Instruments, Inc. However, in using the term JK flip-flop, the applicant does not intend any specific commercial product, only an element or a combination of elements which produces the logic results shown in the truth table in FIG. 2A.

Furthermore, although JK flip-flops are used in the FIG. 1 embodiment, other multi-stable devices may be utilized. A JK flip-flop is convenient for this device because it has both a bistable circuit and a plurality of enable elements in a single package. However, any "multi-stable circuit means," that is any device able to assume a sequence of stable states in response to pulses, could be substituted for the bistable circuit.

Also, any circuit which could receive the voltages from a plurality of logic elements and provide power for state changes of the multi-stable circuit means if and only if the logic element voltages exceed a predetermined level is an "enable element," and would be satisfactory for use in applicant's invention.

It will be understood by those skilled in the art that the multi-stable circuit means may be constructed to change state in response to either negative-going or positive-going pulses. For uniformity only circuits switching in response to negative-going pulses will be considered.

Referring again to FIG. 1, flip-flop 76, which is labeled FF1, has its J terminal coupled to summing point 38 and the J terminal thus receives the voltage present at that summing point. FF1 also has its K terminal coupled to summing point 40 and the K terminal receives the voltage present at summing point 40. Since the resistors connected between the input terminals 18, 20, 22, and 24 and the summing points limit draw-off of current from the parallel redundant elements, the voltage prevailing at each of summing points 38, 40, 42, 52, 54 and 64 will be approximately equal to the sum of voltages provided to each summing point.

In FIG. 1, a digital clock circuit 86 feeds a train of clock pulses to the JK flip-flop 76 at the clock input terminal of flip-flop 76. The clock input terminal is also sometimes referred to as a toggle terminal. The term "toggle" is based on operation of a multi-stable circuit, changing state in response to each pulse applied to the toggle terminal. Thus the act of applying successive pulses to a single multi-stable circuit is commonly termed "toggling" the circuit.

The output of the flip-flop 76 at the Q output terminal is connected to lead 90, which is connected in turn to the clock terminal of flip-flop 80. The Q output terminal of flip-flop 80 is similarly coupled through a lead 92 to the clock input terminal of flip-flop 82. The output Q of flip-flop 82 is fed to a rectifier 94 through connecting lead 96 which is connected to an indicator driver 98 through lead 100.

It should be noted that the four parallel redundant elements shown in FIG. 1 are connected to the six common points 38, 40, 42, 52, 54, and 64 in distinct groups of two. These groups consist of all distinct two element subsets of the set containing signals A, B, C, and D. The signals fed to the summing points 38, 40, 42, 52, 54 and 64 comprise the six combinations A-B, A-C, A-D, B-C, B-D, and C-D.

During operation of the device, the redundant elements 10, 12, 14 and 16 feed their logic signals A, B, C, and D to the input terminals 18, 20, 22, and 24. From these points the logic signals are summed in groups of two at the summing points 38, 40, 42, 52, 54, and 64, as has been previously described. The JK flip-flop elements are connected to the clock so that only if a certain predetermined voltage is present at each of the J and K enable inputs of the flip-flops 76, 80 and 82 will a square wave output be presented at the Q output of flip-flop 82, and therefore be passed to the rectifier through lead 96. This is true because for each flip-flop to repetitively change state, it must have a succession of pulses presented at its clock input terminal.

The clock 86 feeds pulses or toggle signals to the clock terminal of the flip-flop 76. The J and K inputs of FF1 must both have a predetermined voltage level present at times when clock pulses occur so that the flip-flop will be enabled, changing state in response to the clock pulses applied.

From a practical standpoint, the JK flip-flop used should be chosen with its voltage level for enabling somewhat less than the voltage generated at the logic elements during proper operation, yet should withstand twice the normal voltage without breakdown, since the voltages are summed. The purpose of this choice is to prevent loss of merely one logic signal from a summed pair from causing malfunction indication, yet to allow the enable input to withstand the voltage applied during normal operation.

Figure 2B:
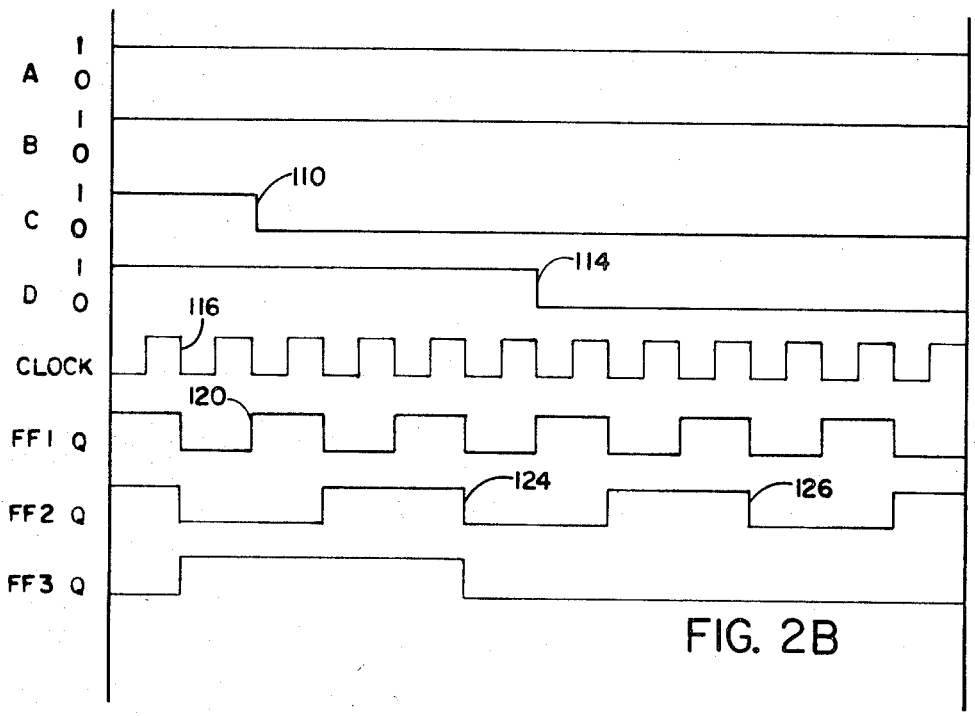
FIG. 2B is a timing chart which describes the operation of various portions of the embodiment of FIG. 1.

The operation of the FIG. 1 embodiment may be more completely understood by reference to FIG. 2B, a timing chart for the FIG. 1 embodiment. FIG. 2B represents the response of the fail safe monitoring apparatus to an illustrative set of circumstances. Suppose that signals A and B indicate proper condition of a particular parameter for the entire time covered by the chart of FIG. 2B; further, the signal C is indicative of proper condition during the first two cycles of clock operation, and at the 110 on the chart, signal C suddenly indicates a malfunction. Assume further that logic signal D is at a level showing proper condition during the first six cycles of clock operation, and at instant 114 suddenly indicates malfunction. Since the monitoring apparatus is intended to sense a lack of proper signal at a majority of inputs, when the second or D signal drops off, the output of the apparatus should indicate malfunction.

The response of the FIG. 1 embodiment to this set of circumstances explains the principle of applicant's invention.

As mentioned previously, when there are one or more normal logic signals present at both the J and K terminals of the flip-flop, the flip-flop will change state in response to each negative-going pulse fed to its clock input. The first negative-going pulse in FIG. 2B, labeled 116, causes a change in state of flip-flop FF1 since the signals A, B and C which supply the J and K terminals of FF1 are all of sufficient voltage at that point in time. At the time 110 the input signal C suddenly drops to a zero level or failure signal. However, since the input signals are effectively summed at the points 38,40,42,52,54, and 64; and the signal C appears only in conjunction with either signal A, B, or D, all of which are normal at that time; the failure of the C signal does not adversely affect the logic state of the signals present at the J and K terminals of the three flip-flops. In other words, at summing point 40, signal A supplies the necessary signal for the K input of flip-flop 1, at point 52 the B input signal supplies the necessary signal level for the K input of flip-flop 2, and at point 64 the D input signal supplies the necessary signal level to the K input of flip-flop FF3 to enable it to continue switching.

Since all that is required for a flip-flop to continue having a square wave output is that it be supplied with a clock signal and have signals exceeding some predetermined level at its J and K terminals, the flip-flop FF1 will continue to change state throughout the time period shown by the timing chart of FIG. 2. This is true because the A signal is in a "1" state throughout this time and the A signal is supplied to both the J and K inputs of flip-flop FF1.

The output of flip-flop FF1 is connected through lead 90 to serve as a clock signal for flip-flop FF2. Thus, flip-flop FF2 is provided with a continuous clock signal during the time period shown in the timing chart. Since the flip-flop FF1 only changes state for each negative-going pulse applied to its clock terminal, the frequency of clock signal it supplies to FF2 will be half that of the original clock signal. Even though the C signal fails at the time 110 and the D signal fails at the time 114, the A and B signal inputs will provide continuous positive level signals into the J and K enable inputs of the flip-flop FF2, thus allowing FF2 to change state continuously in response to the square wave it receives from FF1.

At the time marked 114 on the chart, signal D goes to a zero state, indicating a malfunction of the system. At this point two of the four signals, C and D have dropped to malfunction level. There is no longer a majority of the signals applied indicating proper operation. Since both C and D signals have now failed there will no longer be a "1" state signal at summing point 64 and the K enable input of flip-flop FF3 will no longer have a sufficient signal to provide power for switching.

The flip-flop FF3 receives at its clock terminal the output from the Q terminal of FF2. As shown in FIG. 2B, the output from FF2 will have a frequency equal to one-half that of its input clock signal, or one-quarter that of the original clock signal provided to FF1. At the times 124 and 126 shown in FIG. 2B, negative pulses are fed to the clock input of FF3. At time 124, both J and K enable inputs of FF3 have positive level inputs, therefore FF3 changes state in response to the pulse. However at time 126, the K enable input of FF3 no longer has a positive level signal supplied to it. Its response to the pulse labelled 126 will therefore be as defined in the third rank of FIG. 2A, and it will no longer change state. Since the flip-flop FF3 is frozen in a positive or "1" state, the lack of a square wave output on lead 96 may be measured by a rectifier and the resultant signal fed to an indicator driver used to drive a lamp or audio warning device.

The advantages of this monitor circuit in providing reliable failure information flow from its use of repetitive switching of flip-flops indicate presence of the signals being monitored. Because the vast majority of failures of the test circuit itself will render it unable to change state, it continually tests itself as well as the elements monitored. On the other hand, the typical monitor circuit fails by indicating proper operation approximately half the time, primarily because it has no inherent self-test.

Although the invention has been described with respect to a four signal device it will be apparent to those skilled in the art that any number of input signals two or greater could be similarly configured to produce the desired majority indication result.

Figure 3:
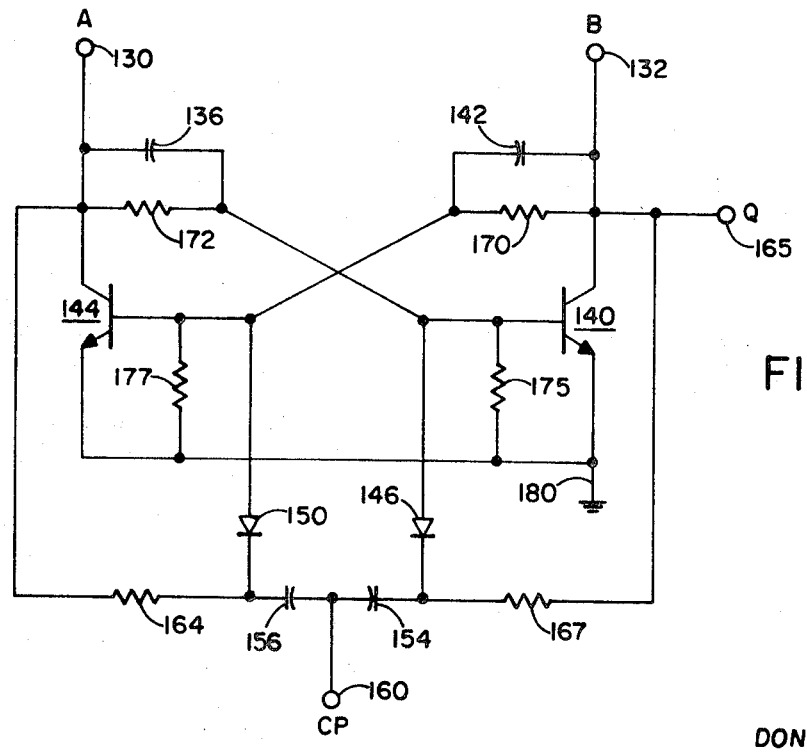
FIG. 3 is a schematic of an alternate embodiment of applicant's invention constructed using discrete components.

FIG. 3 shows an alternate embodiment of the invention constructed using discrete components. The FIG. 3 embodiment is to be used to monitor two signals. Referring now to FIG. 3, a pair of enable inputs 130 and 132 are shown. Attached to A input 130 is a capacitor 136 the other end of which is attached to the base of a transistor element 140. Similarly, a capacitor 142 has one end connected to B input 132 and the other end connected to the base of a transistor generally designated as 144. Two steering diodes 146 and 150 have their anodes connected to the bases of transistors 140 and 144 respectively. The cathodes of diodes 146 and 150 are connected to two capacitors 154 and 156, the other ends of which are connected in common to a clock pulse input 160. A resistor 164 is connected between the cathode of diode 150 and the collector of the transistor 144. Connected between the cathode of diode 146 and a Q output terminal 165 is a resistor 167. Also, two resistors 170 and 172 are connected in parallel with the capacitors 142 and 136 respectively. The B input 132 is also connected to the collector of transistor 140, as is the A or 130 input connected to the collector of transistor 144. Resistors 175 and 177 provide bias between the base and emitter junctions of the transistors 140 and 144 respectively. The emitters of transistors 140 and 144 are connected in common to a reference potential or ground 180.

In operation, the clock pulse terminal 160 receives negative going pulses which may be alternately steered by the steering diodes to one or the other of the bases of transistors 140 and 144. If signals exceeding a predetermined voltage level are present at the A and B inputs, this will cause first one then the other of transistors 140 and 144 to come into a stable state of conduction in a manner well known to those skilled in the bistable multivibrator art. These changes of state will be reflected in the presence of a square wave signal at the Q output terminal shown.

Should either the A or B lose their voltage levels, the bias level of either transistor 144 or 140 will be impaired and the next succeeding clock pulse terminal will fail to cause that transistor to come out of conduction. Thus the output 165 will no longer show a square waveform. In this manner, the presence of positive logic signals at the A and B enable terminals may be actively monitored.

It should be clear from this description that the circuit shown in FIG. 3 can be used effectively as a fail safe AND gate or a specific two input signal embodiment of the invention shown in FIG. 1.

Thus, it is apparent that there has been provided in accordance with the invention a fail safe monitoring apparatus that fully satisfies the objects, aims, and advantages set forth above. While the invention has been described in conjunction with specific embodiments, it is evident that many alternatives, modifications, and variations will be apparent to those skilled in the art in light of the foregoing description. Accordingly, it is intended to embrace all alternatives, modifications, and variations as fall within the spirit and broad scope of the appended claims.

What is claimed is:

1. Signal monitoring apparatus, which comprises:
   a. a plurality of parallel redundant logic elements;
   b. a plurality of enable elements connected to receive signals transmitted by said parallel redundant logic elements;
   c. means for supplying cyclic pulses;
   d. multi-stable circuit means, having a toggle input connected to said pulse supplying means, and associated with the enable elements such that presence of a predetermined signal level at all of said enable elements enables the multi-stable circuit means to respond to said pulse supplying means to assume a sequence of stable states, thereby producing a cyclic output signal;
   e. indicator means for sensing cyclic signals and providing an indication thereof; and
   f. means for connecting the multi-stable circuit means output to said indicator means.

2. The apparatus as defined in claim 1 wherein the multi-stable circuit means and the enable elements comprises a J-K flip-flop.

3. The apparatus as defined in claim 2 wherein the signal provided by said logic elements has a DC component, and the pulse supplying means is a digital clock circuit.

4. In combination with a control signal circuit of the type wherein three or more parallel redundant circuit elements are present, the improvement which comprises:
   a. a plurality of cascaded J-K type bistable circuits, connected to receive DC signals from the parallel redundant circuit elements at the J and K terminals of said bistable circuit such that presence of a predetermined voltage level at a majority of said circuit elements results in presence of said voltage level at all J AND K inputs of said bistable circuits;
   b. means for applying a toggling signal to the clock terminal of the first stage of said cascaded J-K type bistable circuits;
   c. means adapted to receive the output of the terminal stage of said cascaded J-K type bistable circuits, and to sense the appearance of an AC signal at said output, whereby the existence of DC signals at a majority of said parallel redundant circuit elements is monitored.

5. The apparatus of claim 4 wherein the parallel redundant circuit elements are connected to the J and K inputs in subsets of two elements each, each subset being distinct from all other subsets, and all possible distinct subsets are connected to J and K inputs.

6. The apparatus of claim 5, and a rectifier connected to the final stage of the cascaded J-K type bistable circuits.

* * * * *